Patented May 8, 1923.

1,454,421

UNITED STATES PATENT OFFICE.

WILBUR L. WRIGHT, OF FULTON, NEW YORK.

GREASEPROOFING COMPOSITION AND FIBROUS MATERIAL TREATED THEREBY.

No Drawing.   Application filed May 10, 1920.   Serial No. 380,365.

*To all whom it may concern:*

Be it known that I, WILBUR L. WRIGHT, a citizen of the United States of America, and resident of Fulton, county of Oswego, State of New York, have invented certain new and useful Improvements in and Relating to Greaseproofing Compositions and Fibrous Material Treated Thereby, of which the following is a specification.

This invention relates to greaseproofing compositions and fibrous material treated thereby, and the objects and nature of the invention will be readily understood by those skilled in the art in the light of the following explanations of what I now believe to be the preferred expressions and embodiments of my invention.

It is an object of my invention to provide paper or fibrous material with a greaseproof body either within the material or as a coating that embodies a novel and advantageous ingredient for maintaining the flexibility of the greaseproof body or coating, and further to provide an exceedingly efficient and economical greaseproofing composition that embodies such ingredient.

With these and other objects in view my invention is characterized by the presence of soluble (emulsified) cocoanut oil as an ingredient in such greaseproofing body or coating or in such composition, to maintain the flexibility of the body or coating.

My composition consists essentially of cocoanut oil and a suitable body such as an adhesive or gelatinous material. This composition is prepared in the form of a solution and applied to the paper or other fibrous material to form a coating thereon that is impervious to grease. The composition can also be so applied as to form a grease barrier within the fibrous material i. e. can be applied to the material, say during the process of manufacture, to fill or surround the fibers of the material and form a grease proof body impregnated or located on and within the material.

The cocoanut oil can be mixed with various adhesive solutions. Various gums, casein, or gelatine can be used as the body or adhesive of the composition.

For instance, I can prepare a solution of gelatine and cocoanut oil. The cocoanut oil is rendered soluble by being emulsified in any usual or suitable manner as will be readily understood by those skilled in the art.

The gelatine-cocoanut oil solution can be prepared by introducing water, gelatine and emulsified cocoanut oil into a suitable receptacle and heating the mixture to a suitable temperature (say about one hundred and seventy five degrees Fah.). The mixture can be stirred and heated until all ingredients are thoroughly dissolved and mixed.

This mixture (composition) is applied to the paper or other fibrous material, while hot, as it solidifies when cool.

The ingredients can be mixed in about the proportions of ten to one hundred parts of soluble cocoanut oil; about two hundred to three hundred parts gelatine, and about one thousand parts water, more or less.

However, I do not wish to limit myself to such proportions as they are subject to more or less wide variations.

I have discovered that paper or other fibrous material having a coating or grease barrier that includes cocoanut oil, maintains its flexibility (under varying conditions) against cracking, checking and breaking even though the material is bent, flexed or dented, or subjected to movement under variations in temperature and expansion and contraction, and is of peculiar advantage as a coating for the inner surfaces of paper containers.

I herein refer to the oil as being "soluble" because it is in such form or so treated as to be capable of mixing with water, that is, the oil is capable of mixing with the adhesive or gelatinous solution to meet the requirements of my invention.

Cocoanut oil possesses the peculiar quality of drying very slowly. Brazil nut oil also possesses this peculiar quality and can be used in my composition but is too expensive for ordinary commercial uses in this connection. Some other vegetable oils can be employed but so far as I have been able to discover, cocoanut oil is the best suited for my purposes.

The composition can be added to paper stock or fibrous material in the process of manufacturing paper so that the finished paper product will be so impregnated with the composition as to be impervious.

Food products are not damaged or tainted by the presence of the cocoanut oil, and said oil is economical and can be obtained as a pure vegetable product, although my invention contemplates any other oil suitable for the purpose and rendered soluble, or capable of properly mixing with the adhesive or gelatinous solution.

What I claim is:—

1. Paper and fibrous material having a coating produced by the application thereto of a liquid grease proofing composition embodying cocoanut oil.

2. Paper material and the like having a coating produced by the application thereto of a composition comprising cocoanut oil and an adhesive solution.

3. Paper material and the like having a coating or body produced by the application thereto of a composition composed of a solution of cocoanut oil and an adhesive.

4. A greaseproofing composition consisting essentially of emulsified cocoanut oil and an adhesive solution.

5. A fibrous material container for food products, embodying a grease barrier that includes vegetable oil and an adhesive.

6. Fibrous material embodying a grease barrier that comprises cocoanut oil and a body forming ingredient.

7. A fibrous material container for food products internally coated by a composition embodying a gelatinous material body and cocoanut oil.

8. Sheet fibrous material embodying a grease barrier comprising a gelatine body and cocoanut oil.

WILBUR L. WRIGHT.